United States Patent
Goertz et al.

(10) Patent No.: US 8,078,518 B2
(45) Date of Patent: Dec. 13, 2011

(54) ATM EXCEPTION BALANCING SYSTEM

(75) Inventors: Jeffrey R. Goertz, Liberty, MO (US);
Ivette Yoshida, Royal Oaks, CA (US);
Susan Joslin, Selkirk, NY (US); Tony Hopkins, Hurst, TX (US)

(73) Assignee: Bank of America Corporation, Charlotte, NC (US)

( * ) Notice: Subject to any disclaimer, the term of this patent is extended or adjusted under 35 U.S.C. 154(b) by 252 days.

(21) Appl. No.: 12/432,251

(22) Filed: Apr. 29, 2009

(65) Prior Publication Data
US 2010/0280871 A1 Nov. 4, 2010

(51) Int. Cl.
*G06Q 40/00* (2006.01)
(52) U.S. Cl. ............................................. 705/35; 705/38
(58) Field of Classification Search .................... 705/35, 705/38
See application file for complete search history.

(56) References Cited

U.S. PATENT DOCUMENTS

2003/0217005 A1* 11/2003 Drummond et al. ............ 705/43
2006/0212391 A1* 9/2006 Norman et al. ................. 705/40

OTHER PUBLICATIONS http:// www.gasper-corp.com Vantage Transaction Monitor.*

* cited by examiner

*Primary Examiner* — Ella Colbert
*Assistant Examiner* — John Anderson
(74) *Attorney, Agent, or Firm* — Michael A. Springs; Moore & Van Allen PLLC; Sreenivas Vedantam (57) ABSTRACT

An ATM exception balancing system is disclosed. Embodiments of the invention provide a method of resolving image ATM transaction exceptions and enabling reconcilement of ATM transactions. An exception record can be created and stored for each batch of image ATM transactions wherein the credit and the debit for the batch of image ATM transactions do not match, and the exception record can be displayed to an analyst. Input can be received from the analyst indicating a resolution of an exception. Possible resolutions can include a general ledger entry, a customer adjustment, and/or an ICA/WIP entry. The system can optionally provide for reporting and performance analysis. Image ATM cash transactions, image ATM check transactions, or both, can be included.

25 Claims, 4 Drawing Sheets

ATM EXCEPTION BALANCING SYSTEM

BACKGROUND

Automated teller machines (ATMs) are very popular with financial institutions and their customers for the convenience they provide in enabling customers to complete a variety of transactions at any time convenient for the customer. ATMs enable both deposits to and withdrawals from customer accounts, and therefore require reconcilement of transactions and customer account balances just as is required of traditional lobby tellers. However, ATM transactions don't necessarily leave the same type of "footprint" as transactions entered by lobby tellers, making it difficult to include reconcilement of ATM transactions in currently existing financial institution reconcilement processes.

SUMMARY

Embodiments of the present invention provide a computer-implemented method of resolving image ATM transaction exceptions and enabling reconcilement of ATM transactions in a manner similar to that used to resolve lobby teller transaction exceptions. Embodiments of the present invention provide computer-implemented methods and systems for accessing a batch of image ATM transactions stored in a computer system, calculating a debit and a credit for the batch of image ATM transactions, comparing the debit and credit for the batch of ATM image transactions, creating and storing an exception record for the batch of image ATM transactions when the credit and the debit for the batch of image ATM transactions do not match, displaying to an analyst the exception record for each batch of image ATM transactions, receiving input from the analyst indicating a resolution of an exception corresponding to the exception record, and reversing the exception, which includes updating a general ledger in accordance with the resolution.

In some embodiments, an unsettled record can be created and stored when the debit has no corresponding credit. Analyst input can be used to create an exception from the unsettled record.

In some embodiments, the batch of image ATM transactions can include image ATM cash transactions. In some embodiments, the batch of image ATM transactions can include image ATM check transactions. In some embodiments, the batch of image ATM transactions can include both image ATM cash transactions and image ATM check transactions.

In some embodiments, an analyst can indicate a resolution of the exception by a general ledger entry, a customer adjustment, or an ICA/WIP (inter-office clearing account/work in process) entry. In some embodiments, the analyst can include the exception in a report, and the report can be disposed to facilitate analysis of performance.

A system used to implement an embodiment of the invention can include a teller exception balancing system (TEBS) server with a plurality of storage folders for storing image ATM transactions. The TEBS server can automatically create the exception record and receive input from an analyst indicating the resolution of an exception. A system used to implement an embodiment of the invention can include a general ledger platform. A system used to implement an embodiment of the invention can also include a transaction exchange (TRX) warehouse functionally connected to the TEBS server and the general ledger platform to distribute data to the TEBS server and the general ledger platform, wherein the data includes entries for the general ledger system and image ATM files which in turn include the image ATM transactions.

In some embodiments, a system used to implement the invention can further include an analyst workstation to display exception records to and receive the input from the analyst. In some embodiments the system can also include a printer to print reports and general ledger tickets.

A system implementing an embodiment of the invention can include a network functionally interconnecting the computing resources that form the TEBS server, general ledger platform, and TRX warehouse. Computing resources that make up the system of an embodiment of the invention in combination with appropriate computer program code can provide the means to implement an embodiment of the invention by the computer program code being executing on a processor and/or computer to perform calculations and to maintain storage media encoded with transaction data and/or a computer program product including the computer program code itself.

BRIEF DESCRIPTION OF THE DRAWINGS

Having thus described embodiments of the invention in general terms, reference will now be made to the accompanying drawings:

DETAILED DESCRIPTION OF THE INVENTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

As will be appreciated by one of skill in the art, various portions of the present invention may be embodied as a device, method, system, computer program product, or a combination of the foregoing. Accordingly, the present invention may at least partially take the form of a software embodiment (including firmware, resident software, micro-code, etc.) or an embodiment combining, in various portions, software and hardware aspects that may generally referred to herein as part of a "system". Software and/or hardware may be utilized in combination with a device or method as described herein. Furthermore, embodiments of aspects of the present invention may take the form of a computer program product on a computer-readable medium having computer-usable program code embodied in the medium.

Embodiments of the present invention are described below with reference to flowchart illustrations and/or block diagrams of methods and apparatus (systems), which may include computer program products. It will be understood that a block of the flowchart illustrations and/or block diagrams, and/or combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

The computer program instructions may be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing some of the functions/acts specified in the flowchart and/or block diagram block(s). Alternatively, computer program implemented steps or acts may be combined with operator or human implemented steps or acts in order to carry out an embodiment of the invention.

The following description is based on an exemplary implementation of an embodiment of the invention for use in resolving automated teller machine (ATM) transaction exceptions and enabling reconcilement of ATM transactions. Embodiments of the present invention provide computer-implemented methods and systems for accessing a batch of image ATM transactions stored in a computer system, calculating a debit and a credit for the batch of image ATM transactions, comparing the debit with the credit for the batch of image ATM transactions, creating and storing an exception record for the batch of image ATM transactions when the credit and the debit related to the image ATM transaction do not match, displaying to an analyst the exception record for the batch of image ATM transactions, receiving input from the analyst indicating a resolution of an exception corresponding to the exception record, and reversing the exception which includes updating a general ledger in accordance with the resolution. Specifically, a computer-implemented method and system for use in resolving a financial system's image ATM transaction exceptions and enabling reconcilement of ATM transactions is described below as an exemplary embodiment of the invention.

ATMs are commonly used by financial institutions to provide convenience for customers and also to provide an efficient means of offering services to customers 24 hours a day, seven days a week. ATMs create an electronic journal (EJ) that is an electronic record, or log, of the activity at the ATM.

Some ATMs now employ an imaging system for recording deposit transactions. ATMs that employ an imaging system for deposits are called "image ATMs". The purpose of the ATM imaging system is to capture images of checks and bills that are deposited, so that a record of the deposit is created and the customer receives immediate credit for the deposit. The present invention offers improved processing for reconciling cash and check transactions that occur at image ATMs.

Image ATMs may feed data into an exception processing system in the following way. The images captured by the ATM are entered into TEBS by way of a universal landing zone. In some embodiments, the EJ data is fed into TEBS. Image data and/or EJ data may be used to create the "credit" portion of the ATM debit and credit used in the balancing system.

The following description is based on an exemplary implementation of an embodiment of the invention used with an image ATM of a financial institution. As used herein, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

In general, and as an exemplary embodiment, an image ATM transaction exception resolution system is described in more detail as follows. The image ATM transaction exception resolution system of the exemplary embodiment enables financial institutions, such as banks, to more easily reconcile transactions that are conducted at an image ATM. Although an image ATM is discussed throughout this disclosure, the present invention may also be applicable to any other type of ATM, or any other place or device associated with the financial institution through which transactions are conducted. The computer-implemented reconcilement method and system of the present invention improves the customer-bank interaction experience for both the customer and the bank by, among other things, providing a computer-implemented detailed, specific and at least partially automated means for reconciling transactions conducted at ATMs.

Figure 1:
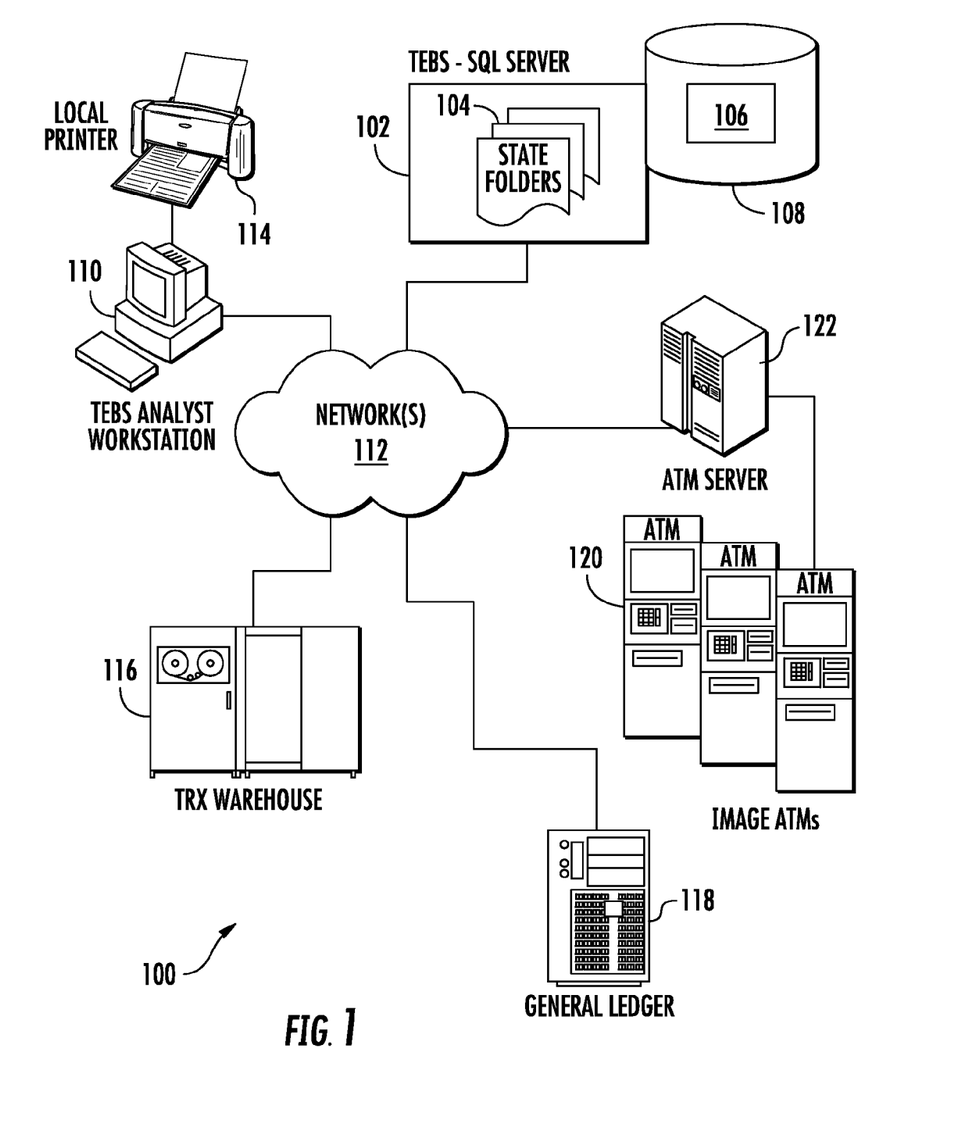
FIG. 1 is system block diagram for example embodiments of the present invention. In this example, system 100 illustrates a system including a teller exception balancing system (TEBS) according to example embodiments of the invention.

FIG. 1 is a system block diagram for example embodiments of the present invention. In this example, system 100 includes teller exception balancing system (TEBS) 102, which is implemented in this example on an SQL server. In addition to the normal teller transaction information, which would reside in such a system, TEBS 102 of FIG. 1 includes a storage folder 104 for each state that is dedicated to dealing with image ATM transactions for all the ATMs in the respective state. In example embodiments TEBS can be implemented by a 3270 batch host subsystem. The TEBS application, 106 of FIG. 1, resides, at least in part, on computer-readable storage medium 108 associated with TEBS server 102. The TEBS application is responsible for reconciling daily teller system transactions, and in embodiments of the present invention, image ATM transactions and capture data. Information from this process is passed to the general ledger (GL) of the financial institution implementing an embodiment of the invention.

The TEBS application in an example embodiment is written in Microsoft™ visual basic. A user, who may be referred to herein as a "TEBS analyst" or an "analyst" uses desktop workstation 110 of FIG. 1 to access the TEBS system over the financial institution's internal network(s) 112. A Web server (not shown) provides access screens formatted in HTML that can be viewed with a Web browser, and exception records and GL "tickets" can be printed on a local printer, 114. In example embodiments, TEBS includes an on-line subsystem and a batch subsystem. The on-line subsystem provides the mechanism to reconcile exception items that are identified by the batch subsystem. The online subsystem can create customer account adjustments, GL entries, and e-mail notifications, as well as produce reports that can be accessed over network(s) 112.

Still referring to FIG. 1, "transaction exchange" warehouse 116 is also connected to network 112 as part of system 100. The transaction exchange warehouse may also be referred to simply as a "TRX warehouse" or simply "TRX." In the example embodiments discussed herein, TRX is a data repository and its associated processing platforms which serve to manage the reading and writing of information to databases. TRX can be used as a processing platform to provide external applications with the ability to store, count, extract, and process financial transactions. A transaction exchange can collect data in increments, consolidate the data, and redistribute it. The TRX can receive transactions from upstream systems, store the transactions within the data warehouse repository, and distribute the transactions as needed. In the example embodiments, the TRX is implemented by a computer platform with high availability and reliability as well as associated databases. Such platforms are known in the art and can be based on many different types of operating systems. In some embodiments, such platforms include an input stage to receive data, a reformatter to format the data as desired, a processing core which provides execution and control functions for the system, and associated database storage systems. A transaction exchange system as used herein may also include an output stage and output reformatter to format data to be provided to other systems such as the TEBS system. Continuing with FIG. 1, GL platform 118 is also connected to network(s) 112, and provides the accounting analysis for the financial institution to maintain its books. As a common accounting practice, a general ledger is used to capture all of a business's transactions, including the contents of all subledgers as well as any transactions that would not fall within any subledger categories.

In the GL system as shown in FIG. 1, calculated debits are offset with calculated credits as determined from collected balances, as is known in the banking art. System 100, as shown in FIG. 1, includes a large network of image ATMs 120, connected to the internal network(s) 112 via an ATM processing system server 122. In practice, the ATM systems of a financial institution can be interfaced into the institution's internal network(s) through a middleware layer (not shown) and servers and/or mainframe computers (not shown) maintain the middleware layer. The ATM processing system stores user ATM login credential information, stores security preferences, carries out the process of presenting the user interface to ATM customers and gathering customer input, and performs various banking transactions.

The various computing platforms and servers shown in FIG. 1 can receive and send files to each other over the financial institution's internal networks via file transfer protocol (FTP) making use of landing zones provided for file exchange. A landing zone is an area of storage into which one computer system can deposit a file for processing by another computer system (and is sometimes referred to as a universal landing zone). A landing zone can be designed to allow pick up of files as well. For example, the TEBS application receives flat files via FTP from the TRX warehouse, which in turn receives files describing image cash transactions from the ATM system. The TEBS batch subsystem is responsible for monitoring the arrival of these files, as well as the validation of their data. It should be noted that although the various computing platforms in FIG. 1 are shown as separate systems, the various functions for which these platforms are responsible could be included in fewer or even a single computer system. For example, each of a plurality of these functions could be performed by an application or applications running on a different logical partition (LPAR) of a mainframe computer system.

Although a computer program product containing computer program code to carry out an embodiment of the TEBS application is schematically represented as application 106 on fixed, tangible, storage medium 108 associated with TEBS server 102 of FIG. 1, this application code could be included with or distributed as part of a computer program product that also provides code to operate the various other servers and databases to implement an embodiment of the invention. In either such case, software components required could be propagated to the appropriate servers over the network(s) as needed. The code can be transferred to storage media at the various servers in other ways as well, for example, portable and/or removable media to install appropriate computer program code at the various servers. Databases, folders, and files required to implement an embodiment of the invention can also be stored for use or transport on the same or similar media as the computer program code.

In at least some embodiments, the ATM exception balancing system includes two subprocesses which are illustrated by flowcharts herein. The first subprocess is a process by which ATM balancing exceptions are determined and documented. The second subprocess is a process by which exceptions are presented to a user, or analyst, and resolved based on input provided by the analyst.

Figure 2:
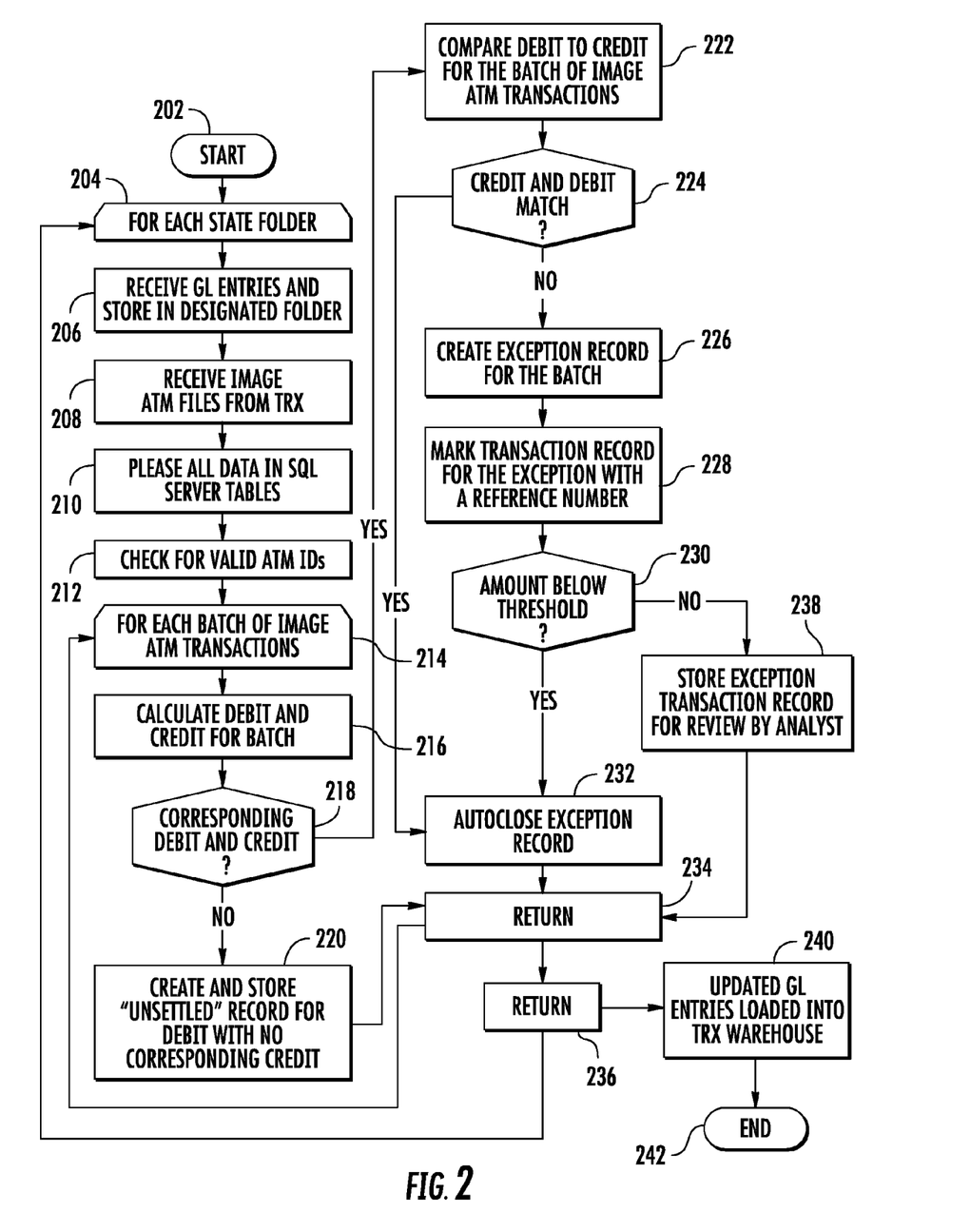
FIG. 2 is a flowchart that presents the process by which ATM balancing exceptions may be determined and documented according to example embodiments of the invention.

FIG. 2 is a flowchart representing the process by which ATM balancing exceptions are determined and documented with TEBS. The determination of ATM exceptions is comprised of gathering data from the general ledger and from transactions that have occurred, and matching the data so that each debit is matched to a credit. As used herein, the term "debit" refers to the sum of the individual entries on the GL which were generated in the universal landing zone (ULZ), representing the contra-entries to the customer's deposit amount resulting from each deposit transaction at the ATM. The debit is created from data captured by the ATM's electronic journal (EJ) and/or by the imaging system. Each transaction carries a unique identifying "document number" including a code representing the state in which the ATM is located, a code representing the ATM manufacturer, a four-digit number unique to the specific ATM (also called the ATM ID) and a final three digits representative of the "batch number". The sum of all transactions carrying the same document number creates the debit. The "batch number" is a number assigned to all individual deposits made from one deposit pull to the next. A "deposit pull" is defined as an occurrence of removal of the deposited cash and/or checks from the ATM. All deposits included within a batch have the same document number.

As used herein, the term "credit" refers to the entry on the GL representing the sum of individual deposits within the batch removed from the ATM in a deposit pull. The credit is derived from the actual deposits in the deposit pull. This "credit" retains the same unique "document number" described in the "debit" portion above, and increments automatically at the time the deposit pull function is performed. Any daily batch for which there is a debit but no corresponding credit is flagged as "unsettled". Any batch, or deposit pull, for which the credit and the debit do not match is flagged as an exception for the net difference.

Referring to FIG. 2, the TEBS exception identification process as it is implemented in an example embodiment of the image ATM transaction exception resolution system is as follows. As an exemplary embodiment, exceptions are identified and reconciled each business day, and the exceptions are stored in folders. In some embodiments, the exceptions are separated into groups for analysis and storage. The groups may be based, for example, on geographic location of the ATM, but other characteristics may be used and will not change the scope of the invention described herein. In at least some examples, the exceptions are stored on a state-by-state basis, wherein the designated state is representative of the location of the ATM. Start 202 represents the start of a new business day in the reconcilement process. Each folder 204 containing information from the ATMs located in a particular geographic region (a state in the present example) is processed in TEBS as indicated in FIG. 2.

Each state folder receives GL entries and stores them in the designated folder 206. Each state folder receives ATM image files from TRX and stores them in the designated folder 208. All data received from GL and TRX is placed in SQL server tables 210 to enable comparisons and matching of debits and credits.

Each data entry is validated as pertaining to a correct ATM ID 212 and affiliated with the correct state. Other features, especially features relevant to the document number, may be verified, such as location of ATM and designated cost center. The return 236 starts the process anew for each state until all of the batches of ATM transactions have been processed for all of the states.

Each batch of image ATM transactions 214 proceeds through the matching process to balance the batch. Credits and debits are calculated for each batch of image ATM transactions 216. A determination is made as to whether each debit has a corresponding credit based on document number. If a debit lacks a corresponding credit, an "unsettled" record is created and stored 220.

In at least some embodiments, unsettled records will be expected to occur because of the timing of certain processes. In one example, a debit represents the sum of cash transactions received on a daily basis for all deposited cash associated with the same document number, and a credit represents the sum of the actual cash from the deposit pull batch. The deposit pull may occur less often than the debit summary, such as once every five days. Therefore, in this example, there will be four days on which there is a debit posted but not a credit. On the fifth day, a credit will be posted that has the same document number as the debits.

A batch lacking a corresponding debit and credit may return 234 and continue to be processed through the ATM exception balancing system until either a corresponding debit or credit occurs, perhaps due to a delay in processing one or the other, or until an analyst identifies the unsettled record as an exception and flags it for further research. A return 234 may also mark the processing of a new batch of ATM transactions. The return 234 may be repeated until all new batches of ATM transactions have been processed.

If a batch has a corresponding debit and credit 218, the dollar amounts of the debit and credit are compared 222. If the dollar amounts for the debit and credit match 224, the record for the batch is autoclosed 232. As used herein, the term "autoclose" refers to the process of creating a GL ticket that prompts a GL entry for the batch and archiving the batch record in a history database. In some embodiments, archiving the batch record in the history database makes the record accessible for use in report generation.

If the dollar amounts of the debit and credit are compared and do not match 224, an exception record is created for the batch 226 and the transaction record for the exception is marked with a reference number 228.

Once an exception has been identified that is due to differing dollar amounts between the debit and the credit for a batch of image ATM transactions, the dollar amount of the difference between the debit and the credit are compared to a predetermined threshold amount 230. If the dollar amount is less than the threshold amount, the exception record is autoclosed. If the dollar amount is more than the threshold amount, the exception record is stored for review and resolution by an analyst 238.

The process returns 236 to begin again at the state folders 204 for each state to repeat the processing of batches of ATM transactions by state until all states are completed. Once the transactions for all states have been processed, and all transactions either stored for review by an analyst or autoclosed, the updated GL entries are loaded into TRX warehouse 238 and the end of the process is reached 240. As illustrated in FIG. 2, the exception identification process is automatic and is repeated at pre-designated times, such as once per business day.

Figure 3:
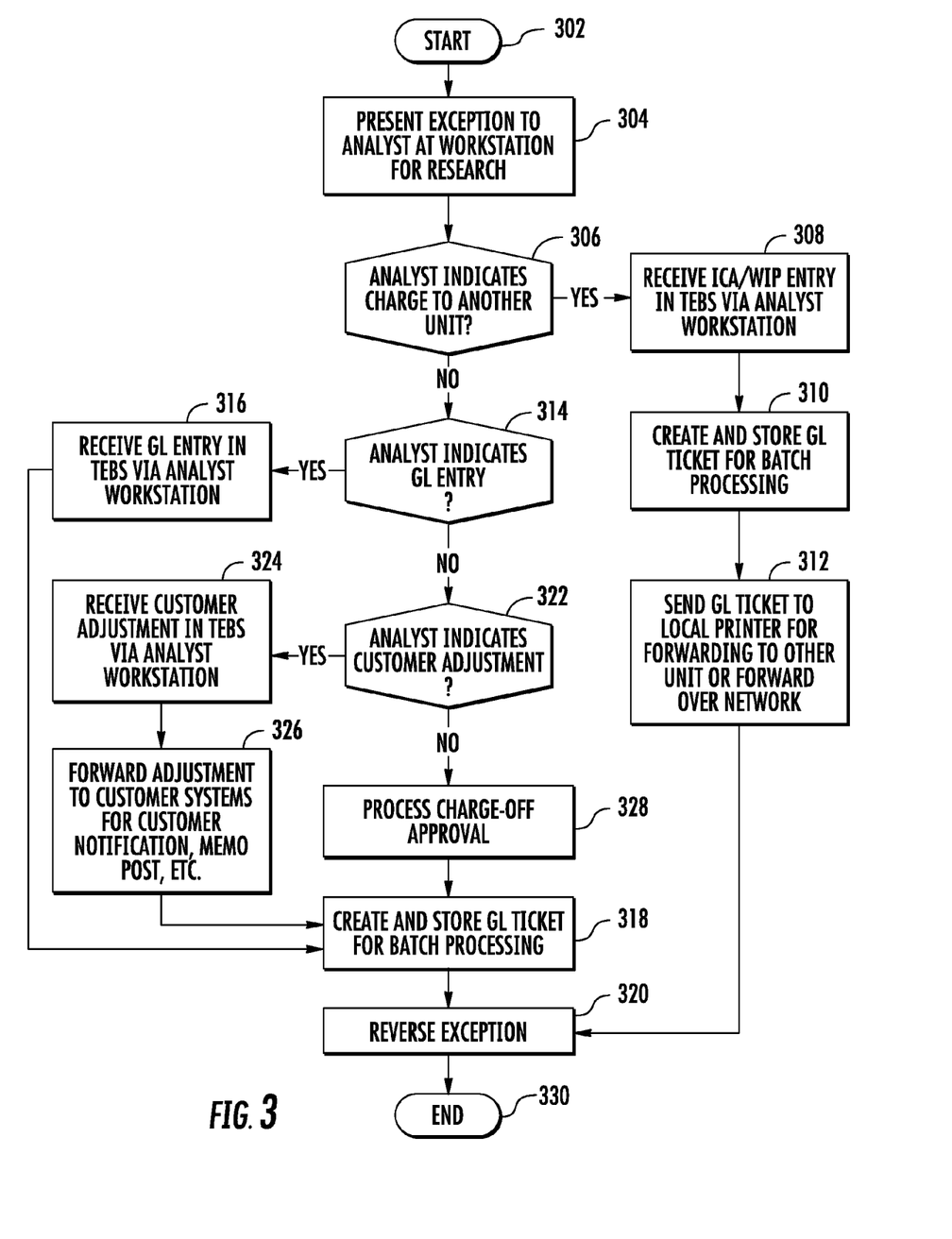
FIG. 3 is a flowchart that presents the process by which exceptions are presented to an analyst for resolution based on input provided by the analyst according to example embodiments of the invention.

FIG. 3 illustrates a process by which exceptions as identified in the portion of the TEBS process described above in FIG. 2 are presented to an analyst, for resolution based on input provided by the analyst. In summary, three different exception resolutions are possible as shown by the process illustrated in FIG. 3. The possible resolutions include an ICA/WIP entry in TEBS, a GL entry, and a customer adjustment. At the start of the process 302, exceptions identified as described in FIG. 2 are presented to an analyst at a workstation for research and analysis 304. At that time, the analyst can determine whether the exception falls into one of three possible categories. The analyst may indicate that the exception is a charge to another unit 306. If this is the case, an ICA/WIP entry is received in TEBS via the analyst's workstation 308.

As used herein, the term "ICA/WIP" (inter-office clearing account/work in process) refers to a GL entry used to offset the exception when the final exception resolution cannot be performed within TEBS and must be manually resolved. All exceptions resolved in TEBS must have an offsetting entry in the TEBS platform so that the credits and debits for each batch of transactions balances, and the ICA/WIP entry serves this purpose. The exception is then corrected, or reversed, by creating and storing a GL ticket for batch processing 310 and sending the GL ticket to a local printer for forwarding to the correct ATM ID or forwarding over the network 312.

If the analyst finds that the charge is not supposed to be with another unit, the analyst then determines whether a GL entry needs to be corrected 314. If the analyst determines that a GL entry needs to be corrected, then the analyst creates a TEBS entry which is received via the analyst's workstation 316. A GL ticket is then created and stored for batch processing 318 and the exception is reversed 320.

If the analyst find that the charge is not supposed to be with another unit and is not a GL entry that needs to be corrected, the analyst then determines whether the exception indicates a customer adjustment 322. If a customer adjustment is determined to be the cause of the exception, TEBS receives the customer adjustment from the analyst's workstation 324. The customer adjustment is forwarded to customer systems for customer notification, and temporary and ultimately permanent posting to the customer's account 326. A GL ticket is then created and stored for batch processing 318 and the exception is reversed 320. If none of the above three resolutions applies, a charge-off approval is processed 328. Once the exception has been reversed in any of these ways, TEBS ends 330 until the next time period in which an analyst reviews exceptions.

In a specific example, the resolution of ATM transaction exceptions occurs as follows. The ATM transaction exceptions are identified on a per-batch basis. A "batch" of ATM transactions is the sum of all transactions that occur from one deposit pull to the next deposit pull. It is understood that this is only one exemplary embodiment of the invention. In the present example, ATMs are reconciled on a state-by-state basis. At a particular financial institution, such as the bank in the current example, four SQL servers are maintained to house various individual state databases.

Exceptions as identified in the present system may involve any feature as predetermined by the designers of the system, and exceptions may be defined as any deviation from a required feature. For example, the system may incorporate checkpoints to verify features such as the ATM ID, ATM location, and ATM designated cost center (which is the cost center designated to receive debits and credits for a particular ATM in the GL).

Each server has individual state folders for receiving data files and sending data files. The servers each contain a Programs folder, which contains a teller exception balancing system (TEBS) application, a beginning of day (BOD) processing application, a file renaming application, a general ledger (GL) creation application and a reporting application.

At a pre-appointed time, such as 6:30 p.m. server time, Monday through Friday, a nightly process job for each state unloads a database table of GL entries created by analysts working exceptions throughout the day to a designated folder as a flat text file. Upon completion of this unload job, the process starts a BOD process that looks for an image ATM file that is transferred by FTP from the mainframe to a specific folder on the server as a flat text file. Once that file is placed in the designated folder the BOD process begins. First the data is placed in a SQL server table by the BOD process. The data is checked to be sure it does not duplicate data previously loaded, and it is checked to be sure it is from the correct state. Once those two checkpoints are completed, the process of handling exceptions begins.

Each transaction record is assigned an ATM ID. The ATM ID is verified against a master file of valid ATMs. If the ATM ID in the record is not a valid ID, an exception record is created.

Exception records can come about in a number of other ways, including but not limited to the following. An exception record is created if a credit is received to a cost center that is not the designated cost center for the ATM deposit pulls.

If the cost center receiving the credit is verified to be the designated cost center for the ATM deposit pull, the following exceptions may occur. An exception is created when there is a shortage in the cash pulled from the ATM (which is the credit for the batch of image ATM transactions) compared to the sum of the individual debits (which is the debit for the batch of image ATM transactions) for deposited cash.

Any individual debits summed for one day with the same ATM ID and document number where the deposit pull has not been performed and therefore unmatched is considered "unsettled". An exception is created and this exception is held as a current exception until a matching credit is received or until an analyst resolves it. In either case, the total sum of unsettled exceptions with the same document number (over one or many days) is compared to the credit from the deposit pull. If no match is found and the exception is not resolved, the exception can be stored for an analyst to research.

If a credit from the deposit pull is received and it equals the sum of deposits with the same document number (over one or many days) in an "unsettled" record, they are matched and archived. If a credit from the deposit pull is received and the sum of debits in an "unsettled" record over one or many days does not match by document number, an exception is created and stored for an analyst to research.

If a credit from the deposit pull is received and it does not equal the sum of debits with the same document number in an "unsettled" record over one or many days they are matched systematically, archived, and an exception is created and stored for the net difference.

For a situation wherein the credits equal the debits, TEBS creates the GL entries to reconcile the general ledger accounts. The GL entries balance the image ATM deposit processing accounts for the debit and the credit. The updated GL entries are then loaded into TRX warehouse.

Where the debit and the credit in an unsettled exception cannot be balanced, TEBS creates a GL entry to a unique clearing account, representing image ATM cash exception differences, for the net difference when the credit does not equal the debits with same document number.

In one example, the threshold level is set at $250. If the amount of an exception is less than or equal to $250, TEBS autoprocesses the exception and autocloses the exception by creating a GL entry to the ATM loss account, and archiving the exception.

At the time when an exception is created, the system will mark every detailed transaction record with a record number so at any time the user can see the records that made up the exception. TEBS records each individual debit representing a customer deposit transaction and displays the information on a detail screen within the exception worksheet that involves said transaction.

Analysts are users of the image ATM transaction exception resolution system as described herein and implemented by the TEBS server. Analysts are pre-approved for access to the image ATM transaction exception resolution system, and it is possible to create differing levels of access, to enable different capabilities for different analysts. Analysts identify exceptions and resolve them within the image ATM transaction exception resolution system. Analysts are assigned a personal login, and in the present example they analyze ATM transactions grouped by state.

Analysts with pre-approved access to the image ATM transaction exception resolution system may be able to perform the following functions, but are not limited to those mentioned in this list. Analysts may add detailed notes up to 250 characters, track research time, log research steps completed; select the root cause of the reason an exception was generated for reporting purposes; view the detailed GL posting date, amount, and description of the individual entries that comprise the exception; create a GL entry to designated accounts within the exception worksheets without going outside the system; create a unit charge ticket with detailed notes to valid other lines of business (LOBs) without going outside the system (because valid units are confirmed from a table which can be updated by a supervisor or system administrator); create an internal charge ticket with detailed note for those instances where an adjustment to a general ledger account or customer account is not accessible within the system; create a "memo posting" which is a temporary debit or credit to a customer account, post a final debit or credit to a customer account, and send notification of customer adjustments to a customer (in some embodiments, with pre-formatted advice descriptions and fill-in fields); offset multiple exceptions when research deems they are related; resolve a portion of an exception and create a new exception for the remaining difference to be researched; and post approved losses to a designated ATM Loss account by the click of a button to various accounts based on dollar amount.

The reporting application of the image ATM transaction exception resolution system can create various reports for analyzing the cause of image ATM exceptions, and for examining performance of individual ATMs. Reports generated may include, but are not limited to, a work statistics report that provides a snapshot of new research and outstanding research, results from researched and closed prior day exceptions, aging of outstanding exceptions and dollars at risk for outstanding exceptions that are greater than 21 business days old. The work statistics report provides a basis for measurement of various metrics including defects per opportunities, fluctuation in volumes, and gross number of dollars affected.

A cause and procedural issues report provides a "root cause" analysis based on analyst selection of cause. Other units utilize the cause and procedural issues report to identify training gaps in ATM deposit processing, trends that need to be addressed due to ATM software issues, and key opportunities for system improvement in general.

A source of recovery report provides analysis of who and/or what is impacted by errors in image ATM deposit processing.

An analyst handle time report is utilized to monitor performance of analysts who close exceptions. Analysts are rated based on their ability to meet and maintain average time to resolve and close exceptions. Additional reports are also available which assist in performance management, work standardization, and audit of work requirements.

To use the image ATM transaction exception resolution system, an analyst first logs into the system with his or her personal login. The analyst then selects a region to work with from the regions presented on the display screen. In the present example, there are four regions, each with its own server. The regions are separated geographically into the Eastern region, the Central region, the Western region, and the NorthEast region.

In the present example, the analyst selects the Eastern region. The analyst then must select a state to work with. The selection of states is presented on the display screen. In the current example, the Eastern states are Florida, Georgia, Maryland, District of Columbia, Virginia, and Eastern Training (to be used for analyst training purposes).

After the analyst selects a state, the analyst is then presented with a list of all unresolved ATM exception records that need to be analyzed. The analyst selects an exception record to view and the exception record is displayed on the display screen work sheet 400, as shown in FIG. 4.

Figure 4:
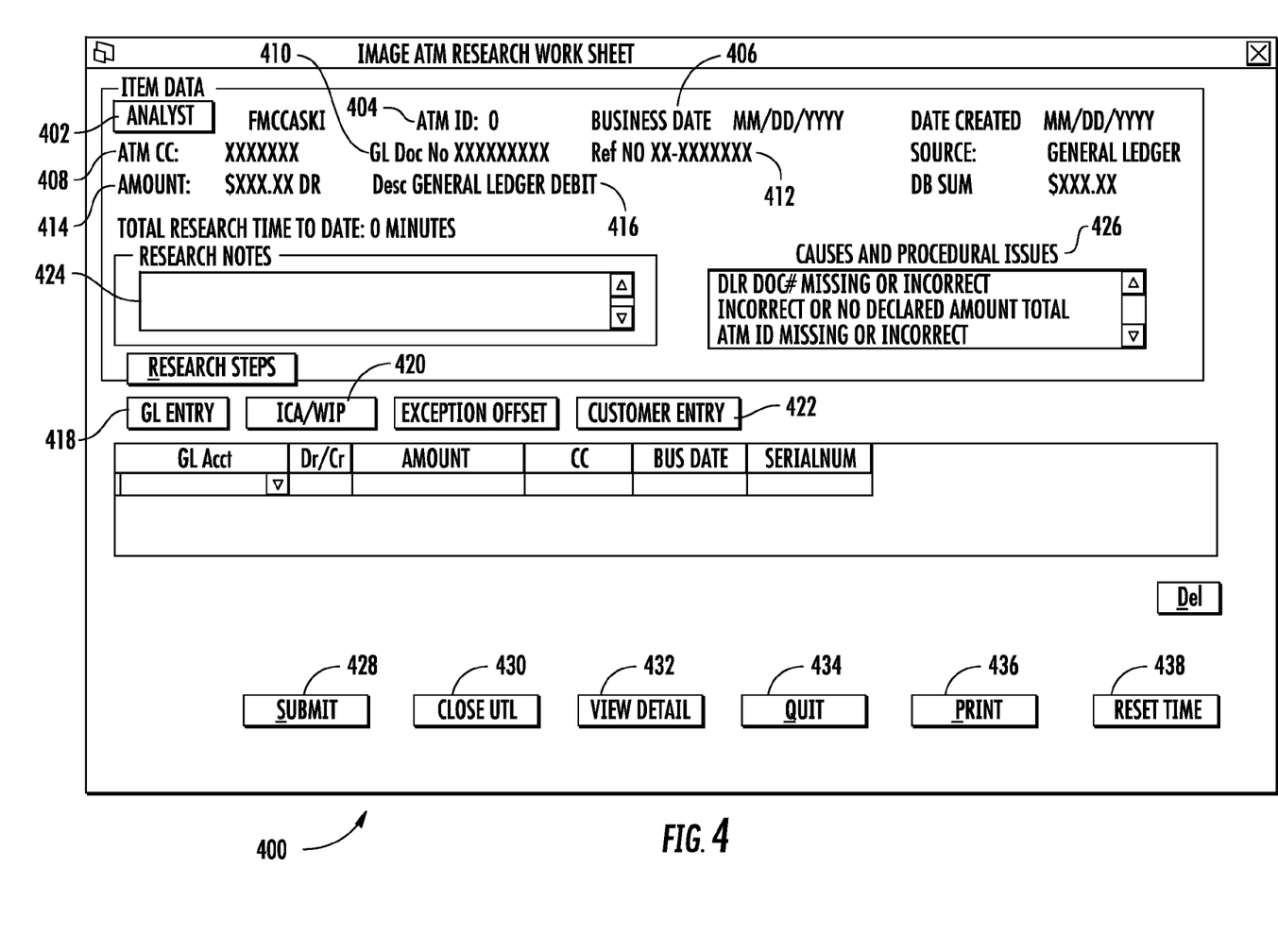
FIG. 4 is a screenshot of an image ATM transaction exception resolution system analyst display according to example embodiments of the invention.

Looking at FIG. 4, it can be seen that the display screen work sheet provides identification information regarding the analyst 402, the ATM 404, and the business date 406 (which represents the date of the transaction). The display screen further displays the ATM cost center (CC) 408, the GL document number 410, the Ref. No. 412 (reference number), the transaction amount 414, and the description of the item 416.

The analyst can enter research notes regarding the exception in field 424, and can choose from exception causes and procedural issues as presented in the menu displayed at 426 in order to better characterize the exception.

The display screen provides buttons for resolving the exception. The analyst can choose from three resolutions or categories: GL entry 418, ICA/WIP 420, and customer entry 422.

Finally, the analyst can complete decisioning of the exception by choosing from the button presented at the bottom of the display screen as shown in FIG. 4. The analyst can choose from submit 428, close UTL (unable to locate) 430, view detail 432 (this enables the analyst to view all records associated with the exception), quit 434, print 436, and reset time 438 (allows error correction for invalid time entry). Submitting the work sheet screen or closing UTL serves to complete the exception record by activating the autoclose phase, wherein TEBS creates GL entries or customer corrections, and archives the exceptions to the history database table, which serves as a data source for reports generated by the system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. In a teller exception balancing system, a computer-implemented method of resolving image ATM transaction exceptions, the method comprising:
   accessing a batch of image ATM transactions stored in a computer system;
   calculating, through the use of a processor device, a debit and a credit for the batch of image ATM transactions;
   comparing the debit and the credit for the batch of image ATM transactions to determine if a match exists between the debits and the credits;
   creating an exception record for the batch of image ATM transactions when the credit and the debit for the batch of image ATM transactions do not match;
   storing the exception record created when the credit and the debit for the batch of image ATM transactions do not match;
   displaying to an analyst the exception record for the batch of image ATM transactions when the credit and the debit for the batch of image ATM transactions do not match;
   receiving input from the analyst indicating a resolution of an exception corresponding to the exception record; and
   reversing the exception, based at least in part on the input from the analyst.

2. The method of claim 1 further comprising creating and storing an unsettled record when the debit has no corresponding credit.

3. The method of claim 1 wherein the batch of image ATM transactions includes image ATM cash transactions.

4. The method of claim 1 wherein the plurality batch of image ATM transactions includes image ATM check transactions.

5. The method of claim 1 wherein the batch of image ATM transactions includes both image ATM cash transactions and image ATM check transactions.

6. The method of claim 1 wherein the resolution of the exception includes at least one of a general ledger entry, a customer adjustment, and an ICA/WIP entry.

7. The method of claim 6 further comprising generating a report including the exception.

8. The method of claim 7 wherein the report is disposed to facilitate analysis of performance.

9. A computer program product comprising computer-readable program code embodied on a computer-readable storage medium, the computer-readable program code executable by a computer to implement a method of resolving image ATM transaction exceptions, the method comprising:

accessing a batch of image ATM transactions stored in a computer system;

calculating a debit and a credit for the batch of image ATM transactions;

comparing the batch of image ATM transactions to determine if a match exists between debits and credits;

creating an exception record for the batch of image ATM transactions when the credit and the debit for the batch of image ATM transactions do not match;

storing the exception record created when the credit and the debit for the batch of image ATM transactions do not match;

displaying to an analyst the exception record for the batch of image ATM transactions when the credit and the debit for the batch of image ATM transactions do not match;

receiving input from the analyst indicating a resolution of an exception corresponding to the exception record; and reversing the exception, based at least in part on the input from the analyst.

10. The computer program product of claim 9 wherein the method further comprises creating and storing an unsettled record when the debit has no corresponding credit.

11. The computer program product of claim 10 wherein the batch of image ATM transactions includes image ATM cash transactions.

12. The computer program product of claim 10 wherein the batch of image ATM transactions includes image ATM check transactions.

13. The computer program product of claim 10 wherein the batch of image ATM transactions includes both image ATM cash transactions and image ATM check transactions.

14. The computer program product of claim 9 wherein the resolution of the exception includes at least one of a general ledger entry, a customer adjustment, and an ICA/WIP entry.

15. The computer program product of claim 14 wherein the method further comprises generating a report including the exception.

16. The computer program product of claim 15 wherein the report is disposed to facilitate analysis of performance.

17. Apparatus for resolving image ATM transaction exceptions comprising:

means for accessing a batch of image ATM transactions stored in a computer system;

means for calculating a debit for the batch of image ATM transactions;

means for comparing the batch of image ATM transactions with a credit to determine if a match exists between the debit and the credit;

means for creating an exception record for the batch of image ATM transactions when the credit and the debit for the batch of image ATM transactions do not match;

means for storing an exception record for the batch of image ATM transactions when the credit and the debit for the batch of image ATM transactions do not match means for displaying to an analyst the exception record for the batch of image ATM transactions when the credit and the debit for the batch of image ATM transactions do not match;

means for receiving input from the analyst indicating a resolution of an exception corresponding to the exception record; and means for reversing the exception, based at least in part on the input form the analyst.

18. The apparatus of claim 17 further comprising means for creating and storing an unsettled record when the debit has no corresponding credit.

19. The apparatus of claim 18 further comprising means for generating a report including the exception.

20. A system to resolve image ATM transaction exceptions comprising:

a teller exception balancing system (TEBS) server including a plurality of storage folders for storing image ATM transactions, the TEBS server operable to automatically:

compare each batch of image ATM transactions to determine if a match exists between the debit and the credit;

create an exception record for each batch of image ATM transactions when the credit and the debit for the batch of image ATM transactions do not match;

present to an analyst the exception record for the batch of image ATM transactions; and receive input from an analyst indicating a resolution of an exception corresponding to the exception record;

a general ledger platform; and a transaction exchange (TRX) functionally connected to the TEBS server and the general ledger platform to distribute data to the TEBS server and the general ledger platform, wherein the data includes entries for the general ledger system regarding the image ATM transactions and image ATM files which in turn include the image ATM transactions.

21. The system of 20 further comprising:

an internal network connecting the TEBS server, the general ledger platform, and the TRX; and an analyst workstation connected to the internal network to display the exception record and to receive the input from the analyst.

22. The system of claim 21 further comprising a printer functionally connected to the analyst workstation to print reports and general ledger tickets.

23. The system of claim 21 wherein the input received at the analyst workstation can indicate at least one of a general ledger entry, a customer adjustment, and an ICA/WIP entry.

24. The system of claim 21 wherein the TEBS server is further operable to maintain an unsettled record when the debit has no corresponding credit.

25. The system of claim 24 wherein the TEBS server is further operable to create an exception for the unsettled record based on the input at the analyst workstation.

* * * * *